QUANTUM MECHANICAL INFORMATION STORAGE SYSTEM

Filed Dec. 26, 1962

JOHN R. SCHRIEFFER
INVENTOR.

BY Robert O. Richardson

ATTORNEY

United States Patent Office 3,341,825

Patented Sept. 12, 1967

3,341,825
QUANTUM MECHANICAL INFORMATION STORAGE SYSTEM

John R. Schrieffer, Philadelphia, Pa., assignor, by mesne assignments, to The Bunker-Ramo Corporation, Stamford, Conn., a corporation of Delaware

Filed Dec. 26, 1962, Ser. No. 247,235
6 Claims. (Cl. 340—173)

This invention relates to an information storage system and, more particularly, to a high density information storage system wherein the storage and retrieval of the information is accomplished by scanning a storage medium with a beam of radiant energy.

Information storage systems which store bits of binary information find utility in data processing equipment, digital computing apparatus, process control installations and other diverse applications. One type of storage system uses a non-random access memory employing a recording medium such as a magnetic tape, drum, or disc wherein bits of information are placed sequentially on the material along its path of movement and are read out in accordance with an address code which identifies the location of desired bits of information recorded along this path. Another type of storage system utilizes a random access memory comprising individual storage elements such as tunnel diodes, cryotrons, or a matrix of magnetic cores through which wires are threaded. In magnetic core memories, the energization of preselected wires in accordance with information to be stored will change the magnetization of those cores through which these wires are threaded and such magnetic cores store this information until such time as a readout mechanism interrogates the matrix of cores to determine the state of magnetization of the individual cores. These and other types of memories, because of their complexity and the multitude of input and output connections required, are of necessity limited in their compactness, and in the density with which information may be stored.

The information storage system of the present invention achieves its high density storage and retrieval of information through the elimination of the multiple connections heretofore required in the storing and retrieval of information from storage elements. In this system a small area of a continuous solid material is effectively used as a basic information memory storage element. The properties of the material are such that when it is subjected to an external stimulus its electrical characteristics are changed. Later, when subjected to a second external stimulus, the change in electrical characteristics may be detected or recognized. More specifically, quantum mechanical energy levels within the atoms immediately under the small area of the material and the occupation of these energy levels by electrons represents information stored in the memory. A bit of information is written or stored on an area of the material by a beam of light of a particular frequency or wavelength and read or retrieved from the material with a beam of light of a different wavelength.

Briefly, the invention herein described is based on the fact that certain impurities, when introduced into a semiconductor material similar to that used in transistors or diodes, for example, will act as energy level traps for electrons. The traps can be filled with electrons excited or raised from the valence band or low energy level of atoms of the semiconductor material by exciting the electrons with the stimulus of a "writing" beam of light of an appropriate intensity and frequency. The filled electron traps act as memory elements, storing electrons until they are liberated from these traps by another external stimulus provided in response to "read" signals. The memory material may be "read" with a beam of light of a different frequency from that of the "write" beam to liberate the electrons, and their liberation can be observed by an emission or absorption of electromagnetic energy such as light, or by a change in the electrical conductivity of the material. The liberation of stored electrons and the absence of stored electrons at the positions interrogated by the "read" beam are the two states or conditions that may be coded as "0" or "1" in a binary code, for example.

In one embodiment of the invention, a thin semiconductor film that has been appropriately doped with impurities serves as an information storage memory material. This film is coated on one surface by a transparent conductive film and on the other surface by a metallic substrate. A pulsed beam of light of a first predetermined frequency and intensity writes information through the transparent film and into the memory when directed toward a desired position on the film. Thereafter a second beam of light different in frequency from the first beam is directed at the film and reads the memory by liberating the electrons trapped by the first beam. The electrons thus liberated change the conductance of the capacitor formed by the plates with the semiconductor film acting as the dielectric. When this capacitor is charged, the change in voltage across the capacitor when the electrons are liberated may be sensed by a detecting instrument such as a high impedance detector, for example. The output from the detecting instrument may be coordinated with the position of the reading light beam on the memory material to provide the information sought. In another embodiment the absorption or emission of energy caused by a reading light beam indicates the presence or absence of previously stored information.

In the consideration of the present invention and for clarity of description of its utility and operation, a brief explanation of the energy band theory of solid materials such as semiconductors will be useful. As is well known, when atoms are isolated each atom possesses a set of discrete electron energy levels characteristic of the type of atom. In the normal state the lower energy levels of such a set are filled with electrons and the upper ones are empty. These energy levels are spaced apart and the space or gap between called the forbidden gap, has no energy levels for the electrons. In accordance with the familiar model of the atom, the atom consists of a centrally located positively charged nucleus surrounded by electrons in orbits. These individual electron orbits are associated with discrete values of the total energy of the atom. The orbital electrons will fill up the lowest energy levels of the atom, leaving the higher levels vacant.

When atoms are brought close enough together for binding to occur and form molecules or solids, the presence of neighboring atoms and electrons affects the behavior of each atom in the solid and the energy levels are no longer uniquely associated with a given atom. The electrons in the levels common to the neighboring atoms are not localized on any one of the atoms but have orbits allowing them to range throughout the solid. This serves to bind the atoms together. The electrons which bind the atoms together are called valence electrons and energy levels which they fill are called valence levels. This interaction between the atoms takes place and leads to the broadening of the allowed energy levels into bands of energy levels.

The unfilled energy levels lying above the valence levels in the individual atom are called the excitation levels of the atom. These levels may contain electrons for brief periods of time when electrons from the valence or lower lying levels are raised in energy by the absorption of the energy from some other source. Thus, if a large number of identical atoms are brought together to form a solid material, each of the energy levels of the individual atoms becomes associated with a band of energy levels for the system of atoms comprising the material. The levels which were originally empty of electrons give rise to empty bands and those levels which were filled with electrons give rise to filled bands. These bands may overlap or may have a gap therebetween. Electrons in the solid are forbidden to have their energy in this gap between the bands. Hence, the gap is referred to as a forbidden gap, energy level gap, or band gap.

Normally, forbidden gaps occur between all of the energy level bands of the solid. Of the completely filled bands the uppermost or the highest energy band is called the valence band. The band directly above the valence band is known as the conduction band. If the conduction band is completely empty of electrons and an energy gap exists between the valence and conduction bands, there is no possibility of changing the energy of electrons in the valence band by a small low frequency electric field. Even though the electrons in the valence band are free to range throughout the material, they cannot be accelerated with an externally applied electric field to carry current. A material in which this condition exists is an insulator. If, within the material, the forbidden gap between the top of the valence band and the bottom of the conduction band is large, there will be a negligibly small number of valence electrons excited to the conduction band by thermal vibrations and this material is a good insulator even at elevated temperatures. If, on the other hand, the conduction and valence bands overlap, there will be vacant energy levels closely adjacent to the filled energy levels. It is therefore possible by the action of an external electric field to change the energy of some of the valance electrons by accelerating them to the conduction band, causing the material to carry a current. Such a material is then a metallic conductor.

If the energy gap of a material is intermediate between these two extremes, there will be a few electrons thermally excited to the conduction band, leaving a few vacancies in the valence band so that there are a limited number of electrons capable of cooperating with an external electric field and the material is capable of carrying an electric current. This material then is known as a semiconductor and the extent of its conductivity is determined by the number of empty states in the valence band and the number of electrons in the conduction band. The extent of the conductivity of the material can be controlled by adding either acceptor or donor impurities to the semiconductor. An acceptor impurity is one that accepts an electron from the valence band; a donor impurity is one that donates an electron to the conduction band.

In contrast to the addition of impurities in a semiconductor material to determine or control its state of conductivity, as in the case of semiconductor transistors, diodes, and other circuit components, for example, the introduction of impurities into the semiconductor material for use in the present invention is for the purpose of introducing a spatial distribution of energy levels within the forbidden band gap of the semiconductor material in order that those electrons in the valence band which are absorbing energy from an external energy source may be raised to these levels and be stored.

A second energy source is applied later to determine if the first energy source had previously raised electrons to these levels. This determination is made possible by the raising of the electrons previously stored in the impurity energy levels to the conduction band, where their arrival may be detected by a change in conductivity of the material. This determination is also made possible with the later application of an energy source which causes the electrons to fall back to the valence band, where their arrival may be detected by the radiation energy thus released. This determination is also possible by measuring the absorption into the material of energy from the later applied energy.

Various impurities provide empty energy bands at certain predetermined energy levels in the forbidden gap of a semiconductor material. These impurity energy levels within the forbidden gap are primarily a function of discrete energy levels of the atoms of these impurities when dissolved in the semiconductor material. Thus the energy levels within the forbidden gap can be determined by the type of impurity atoms used. In the practice of the present invention the type of impurity chosen must provide an empty energy level which will receive those electrons from the valence band that have absorbed energy from a predetermined energy source and conversely, a type of energy source must be chosen that will store electrons at the empty energy level of the impurities in the material.

As previously mentioned, the width of the forbidden band of various materials differs, accounting for the insulative and conductive qualities of the materials. The width of the band gap can be determined under ideal circumstances where the energy levels are independent of temperature. The width is expressed in the amount of energy that must be absorbed by the electrons in order to raise them to the higher energy level across this gap. For example, the band gap of germanium is 0.785 electron volt as compared to a band gap of 1.21 electron volts for silicon, and 3.54 electron volts for strontium sulfide under similar circumstances. In general, the width of the forbidden energy gap in various semiconductor materials decreases as the atomic number of the material increases.

Reference is now made to the drawings wherein.

Figure 1:
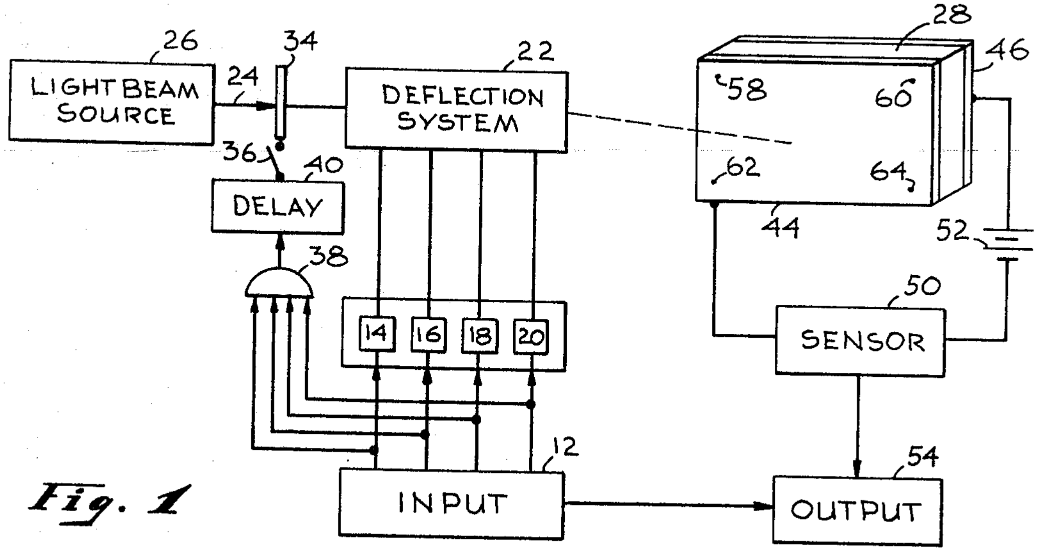
FIG. 1 is a diagrammatic illustration of a storage system embodying the invention.

The storage system shown in FIG. 1 is actuated from signal input means 12 which controls the storage and retrieval of information. The input, representing the address to a computer memory, for example, consists of coded signals which actuate a selected combination of switches such as 14, 16, 18 and 20. These in turn cause a beam deflection system 22 to deflect a light beam 24 from a light source 26 in such a manner that the beam will impinge upon a film of memory material 28 at a particular position. This beam will either store information or read previously stored information at this position on the memory material, depending upon the frequency of the light beam. In one example of such a beam deflection system, a light beam may be polarized and passed through a series of polarizing switches and birefringent prisms, which have double refractive properties. As the polarizing switches, such as Kerr cells for example, are actuated, the planes of polarization of the light beam passing through the various prisms are rotated so that the two refractive indices of the prisms will cause the beam to be deflected through various angles. In this manner the beam can be made to impinge upon a surface at selected positions determined by the combination of polarization switches that have been actuated. A beam deflection system of this type is disclosed in copending application entitled, "Light Beam Scanner," Ser. No. 228,563, filed Oct. 5, 1962, by Uwe J. Schmidt, now Patent No. 3,283,-241, and assigned to the assignee of the present invention.

It is understood that the invention is not intended to be limited to the use of any particular beam deflection system. If desired, a system using mechanically moving parts, such as rotatable mirrors or prisms, may be employed. Likewise, a projection system might be utilized to project on the memory material (through suitable filters) spots previously recorded in desired positions on film. Thus, various beam deflection arrangements may be utilized, although numerous advantages are derived from the use of an electronic deflection system, such as previously described.

Signals from the input means 12 also control pulsing of the light beam. This is done, in the illustration in FIG. 1, with a shutter 34 placed in the light beam path so that the beam may be pulsed during the storage and retrieval of information. In this manner the light beam is blanked out and will not cause storing or retrieval of information while the beam is moving to a selected position. The shutter is connected to input means 12 through a switch 36, a delay device 40 and an OR gate 38, which will pass a signal to the delay device in response to the presence of any one or more of the signals from input means 12. Delay device 40 provides a short delay to enable the switches and deflection system to be properly set before the light beam is sent through the deflection system. Thus, the input signals not only select the appropriate combination of switches to deflect the beam to a desired position on the memory material 28, but they also actuate shutter 34 to permit light passage therethrough, whereby the memory material 28 may be excited with light at the desired position.

As will be explained in more detail hereafter, a light beam of the proper frequency impinging on the memory material at a particular position causes the energy level of electrons at that position to be raised from the valence level to a higher level called the storage level. The electrons remain at the storage level until they are raised to the conduction level by the action of a light beam of a frequency different from the first. The light beam source 26 may contain two monochromatic sources of the proper frequencies for writing and reading or it may contain a single source of white light, for example, and appropriate filters to obtain the desired two frequencies from the white light frequencies.

If the apparatus is to be used for random access retrieval of information stored at selected positions, the beam path is selected and the light beam of a frequency suitable for reading is then pulsed to excite to the conduction band only the electrons previously stored at the storage level at that selected discrete position. The energy storage level is such that the light beam does not also raise electrons from the valence band to the storage level. This would cause false writing or storage of information that would cause subsequent reading operations to be inaccurate. A light beam also may be used continuously without being pulsed for scanning the entire memory to read out all information therefrom if desired. As will be more fully described hereinafter, the frequency of the light beam is different in the writing and the reading modes of operation.

The detection of previous storage of information at a selected beam position on the memory material may be accomplished by sensing the conductivity of the material during the reading operation. This may be done in one embodiment by using the material as a dielectric in a charged capacitor.

The memory material 28 is coated on its front surface with a transparent conductive film 44 and on its back surface with a conductive substrate 46. This then can function as a capacitor, with the film 44 and substrate 46 functioning as plates and the memory material 28 serving as a variable dielectric having a conductance of a value which depends upon the presence or absence of electrons in the conduction band during readout. If desired, the conductive substrate 46 may also be of transparent material so that the storage of information may be done with a light beam projected onto the memory material from one side and the retrieval of information may be done with the readout beam projected onto the memory material from the other side.

In the memory readout operation at a selected position on the memory material 28, a bit of information previously stored at this position in the form of electrons raised to the energy storage level will be sensed by a sensor 50, which may be a high impedance detector, for example, connected across the capacitor and in series with a voltage source 52 for charging the capacitor. The electrons are raised to the conduction band by the readout beam of proper frequency, thereby increasing the conductance of the memory material. This permits current flow across the charged capacitor, which causes a decrease in voltage across the capacitor that can be observed by the high impedance detector. This information can then be fed through output means 54 to a suitable readout device, not shown. This readout device may be any information retrieval instrument such as a card punching machine, for example. Output means 54 may be appropriately synchronized with the signals at input means 12 to correlate the input-output information such as would be desired in high speed information retrieval.

Figure 3:
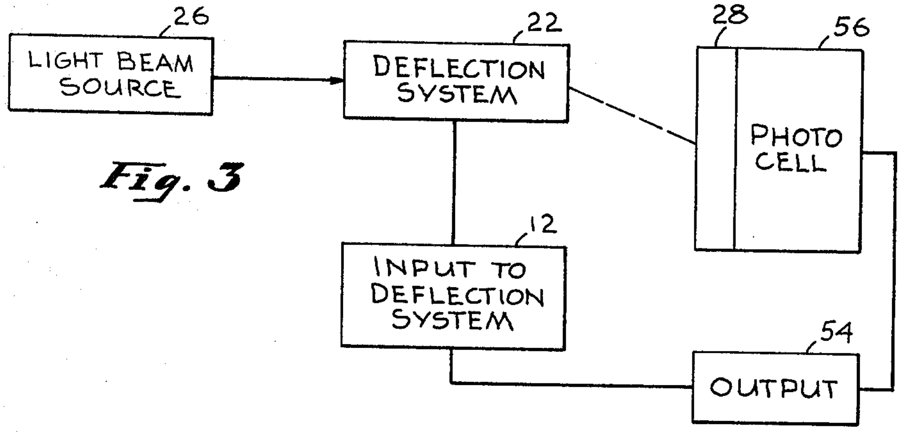
FIG. 3 is a diagrammatic illustration of a modified form of information retrieval apparatus.

If the readout beam is of a different frequency such that the electrons return to the valence band, light energy is released and sensor 50 then may take the form of a suitable radiation detector, such as a photocell in close proximity to the memory material, for example. Similarly, an absorption of energy is required to raise the electron energy level to the conduction band. This absorption of energy may also be detected with a photocell behind the memory material. These two means of detection will be more fully described hereinafter with reference to FIG. 3.

The storing and retrieval of information from the memory material 28 is more fully explained with reference to FIG. 2, which shows an energy diagram of a suitable semiconductor material, such as germanium, silicon, or strontium sulfide, for example.

At this point a brief review of atomic structure will be helpful. Atoms are made up of a nucleus surrounded by shells of electrons. Each shell of a particular atom consists of a specific number of electrons. The electrons in the outermost filled shell of the isolated atom interact when many atoms are brought together to form a solid. Their interaction provides the binding energy of the solid, and their energy levels are spread out to form the valence band of energy levels in the solid.

A semiconductor material, falling in a category between good conductors and good insulators, is not used in its pure state but has controlled amounts of impurities added (called doping) to give desired conduction properties to the material. Donor impurities add free electrons that would not be held by the valence band. The electrons or negative charges not bound in the crystal structure may be used as current carriers. Just as donor impurities may be added to donate electrons to the semiconductor material, acceptor impurities may be added that accept electrons from the material, leaving holes in the atom structure. With donor impurities current flow is by electrons, whereas with acceptor impurities, current flow is by holes. An electron, being a negatively charged particle, will be attracted by and will move toward a positive charge, and the hole being the absence of an electron and having a positive charge, will be attracted by and will move toward a negative charge. An electron leaving the valence band will leave a hole in the valence band and if an electron fills a hole in the valence band the charges will be cancelled.

Figure 2:
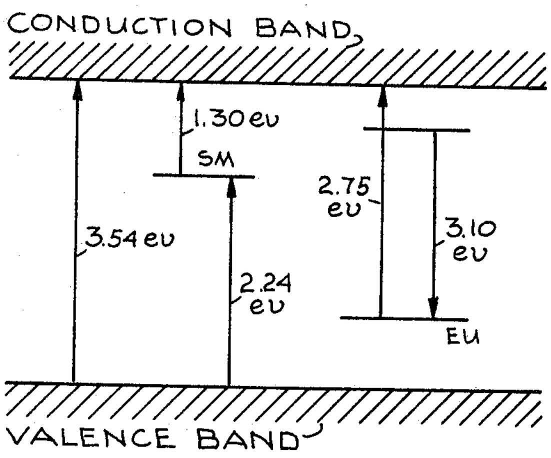
FIG. 2 is an energy level diagram of a memory material used in the system.

Referring back to the energy diagram in FIG. 2, the valence band represents a zero energy level of the atoms of the material. This is the state in which the atoms will remain in the absence of some external excitation. The conduction band represents a higher energy level, and electrons in this band add to the conductivity of the material. Between these energy bands is a forbidden energy gap in which the electrons are not allowed. If enough energy is absorbed, electrons will be excited from the valence band into the conduction band. Otherwise, they will remain in the valence band.

Within this forbidden energy gap are energy states due to impurities known as donor impurities or donor traps and acceptor impurities or acceptor traps. If equal concentrations of donor and acceptor impurities are introduced, electrons from the donor impurities fall into the acceptor traps at low temperature and thus the donor levels are empty in the equilibrium condition before the writing or information storage operation. By illuminating a given area of the film with light of proper frequency, electrons from the valence band will be excited into the donor levels and be trapped and the holes will be trapped at the acceptor levels. Thus the information is written or stored in the memory. These traps retain electrons and holes in metastable energy levels after the excitation source has been removed. The electrons and holes are trapped at spatially separated levels so that their recombination probability is small during the information storage period.

It should be noted that upon exciting electrons from the valence band, holes will be left behind, which, if left free, will add a leakage conductance to the system. This difficulty is eliminated by inserting the set of acceptor impurities or traps to accept the holes and eliminate them from the conduction process. The hole left in the valence band in the storage operation will then be captured by an acceptor impurity which already has an electron from the donor impurity. These electrons and holes recombine and fall back to the valence band or level.

By choosing the ionization energies of the donors and acceptors to be sufficiently large, thermal excitation of the trapped carriers by absorption of lattice vibrational energy will be extremely slow at low temperature. The permanence of the stored information in the memory may be of the order of weeks at room temperature if stray light is excluded and may be increased to the order of years by operating at liquid nitrogen temperature.

One example of semiconductor material that may be used as a memory material is strontium sulfide, wherein an ultraviolet light having an energy of 3.54 electron volts will excite electrons from the valence band to the conduction band. Samarium and europium have been found to be suitable impurities useful with strontium sulfide. These impurities are finely divided, mixed with the strontium sulfide, sintered, and formed into a compound with a density of approximately $10^{18}$ to $10^{19}$ impurities per cubic centimeter, in a manner well known in the art.

In writing or storing information in the memory material, light is beamed onto the desired position. This light is preferably of such frequency that energy of a value of 3.54 electron volts is absorbed by the electrons in the semiconductor material, raising them to the conduction band from where they fall to the electron traps formed by the samarium. Alternatively, this storage or writing process may be accomplished by illumination with a light of a frequency of sufficient value to raise electrons from the europium impurities to the conduction band. A blue light of approximately 2.75 electron volts will do this. When the light is removed, the electrons remain in the donor trap or samarium impurity level and retain a potential of 2.24 electron volts. The holes from the valence band due to the electron departure are filled by additional electrons from the acceptor trap of europium impurities, creating holes at this energy level.

A reading beam of a frequency sufficient to give the electrons an additional voltage potential of 1.30 electron volts, for example, a beam of infrared light, lifts electrons from the samarium donor traps into the conduction band where they are free to move under the influence of an applied electric field, thereby changing the conductivity of the material. If the reading beam impinges on a selected area for a sufficient length of time, virtually all of the electrons raised by the beam energy to the conduction level will fall to the valence level. Thus, the memory may be cleared. It should be noted that the potential required to raise the electrons from the donor traps to the conduction band, 1.30 electron volts, is less than that required to raise the electrons from the valence band to the donor traps, 2.24 electron volts. If these two potentials were closer together in value, in addition to raising the electrons from the donor traps to the conduction band, this same light used in reading out stored information might also be simultaneously storing false information by raising the energy level of additional electrons from the valence band to the donor traps.

The detection by a read beam of the presence or absence of electrons trapped in impurities at levels above the valence band may be done in several ways. The detection apparatus may depend upon the absorption of light of the writing frequency, the emission of light when the electrons drop to the ground state, or upon the change in conductivity due to the presence of electrons in the conduction band during the read operation. The conduction method was described in connection with the apparatus presented in FIG. 1. The other two methods may be practiced with the apparatus of FIG. 3. Here there is shown the memory material 28 with a suitable photocell 56 positioned adjacent thereto. A read beam of light is positioned on the material by the deflection system 22 in accordance with the instructions from the input means 12. If the energy level at the selected position is that of the samarium level or 2.24 electron volts, indicating prior storage of information, the absorption of 1.30 electron volt photons from the read beam may be detected by the photocell 56. This information is coordinated with the positioning information from input means 12 at output means 54 to read out the stored information from the selected position on the memory material 28.

A photocell of the proper light sensitivity characteristics may be used to detect the light emission as the electrons fall from the conduction band, through the upper and lower europium impurity energy levels. Between the two energy levels 2.10 electron volts of energy is released, emitting a yellow light. At the lower level the electrons recombine with the previously stored holes. Thus, photocell 56 may be used to detect light energy absorbed from the light beam or the light emitted as energy is released in the memory material, according to the selectivity of the photocell and the method selected by the operator.

The total energy of illumination is a product of the intensity and duration of the light beam. Since a laser beam provides the highest intensity possible, the dwell time of the light beam over the storage material may be shorter when a laser is used. A laser beam also provides the smallest spot, since it can be focused to a spot approximately a wavelength in diameter. The laser having a total power output of 15 milliwatts over a 10 micron diameter spot will have an intensity of $10^4$ watts per square centimeter. A duration of less than 1 microsecond is sufficient to trap enough electrons at a selected spot. As previously indicated, the laser beam or other light source should have a frequency within the ultraviolet range (3.54 electron volts), blue light range (2.75 electron volts), or green light range (2.24 electron volts) for the storage of the electrons.

In detecting either the emission in the memory material or the absorption of the readout beam, a readout beam having an intensity of 1 watt per square centimeter and of a duration less than 10 microseconds is sufficient to saturate the area to be excited and thus give an indication of previously stored information. However, a somewhat longer time was found to be necessary when the conduction detection method was used.

Because of the heavy concentration of storage positions in a small area of the memory material, any slight change in physical dimension of the material will give false information since the beam will not impinge on the material at the position dictated by the input signals. Since a two-dimensional $10^9$ bit memory has to have over 30,000 discrete storage elements in each dimension (which may be of the order of one foot), the stability of the beam positioning on the memory material has to be approximately one part in $10^5$ parts. Such accuracy can easily be attained in the present state of the art. The lateral dimensions of the storage units are determined primarily by the beam size, the ability to meet the beam positioning tolerances and by the stored energy density that can be achieved in the solid. In addition, any registration problems may be readily solved by storing coordination information at preselected positions such as at points 58, 60, 62, and 64 (FIG. 1) on the memory at the time of writing with the beam. Prior to commencement of reading, the beam may be deflected to these positions and appropriate calibration adjustments made.

Having thus described the invention and several embodiments thereof, it is desired to emphasize the fact that many further modifications may be resorted to in the practice of this invention in a manner limited only by a just interpretation of the following claims.

The embodiments of the invention in which an exclusive property or privilege is claimed are defined as follows:

1. In an information storage system,
- a memory material having valence and conduction electron energy levels and at least one storage electron energy level intermediate said valance and conduction levels,
- means for subjecting said material to a first beam of light of a first frequency to raise electrons in said material from said valence energy level to said storage energy level,
- means for subjecting said material to a second beam of light of a second frequency to raise said electrons from said storage energy level to said conduction energy level, and
- means for detecting when said electrons reach said conduction energy level.

2. The combination of claim 1 wherein said storage energy level is closer to said conduction energy level than to said valence energy level.

3. The combination of claim 1 including means for selectively positioning said beams of light in two dimensions on a surface of said memory material.

4. An information storage system comprising,
- a film of memory material capable of absorbing energy from a beam of radiant energy incident thereon having a first frequency and releasing said energy when subjected to a beam of radiant energy having a second frequency,
- means for providing said beams of radiant energy of said first and second frequencies,

- means for selectively positioning said beams of radiant energy on said film, and
- means for detecting release of energy from said film of memory material.

5. An information storage system comprising,
- a film of memory material having at least first and second electron energy levels,
- a source of radiant energy of first and second frequencies,
- means for selectively positioning on said film a beam of radiant energy of said first frequency to raise electrons in said memory material from said first to said second energy level,
- means for selectively positioning on said film a beam of radiant energy of said second frequency to cause said electrons to return to said first electron energy level, and
- means for detecting a return of said electrons to said first energy level from said second energy level.

6. An information storage system comprising,
- a film of memory material having at least first and second electron energy levels,
- a source of radiant energy of first and second frequencies,
- means for selectively positioning in two dimensions on said film a beam of radiant energy of said first frequency to raise electrons in said memory material from said first to said second energy level,
- means for selectively positioning in two dimensions on said film a beam of radiant energy of said second frequency to cause said electrons to return to said first electron energy level, and
- means for detecting a return of said electrons to said first energy level from said second energy level.

References Cited

UNITED STATES PATENTS

| | | | |
|---|---|---|---|
| 2,700,147 | 1/1955 | Tucker | 340—173 |
| 2,776,371 | 1/1957 | Clogston | 250—27 |
| 2,845,611 | 7/1958 | Williams | 340—174 |
| 2,901,662 | 8/1959 | Nozick | 340—173 |
| 3,120,623 | 2/1964 | Cooper | 313—65 |
| 3,229,221 | 1/1966 | Sorokin | 330—4.3 |

BERNARD KONICK, *Primary Examiner.*

TERRELL W. FEARS, *Examiner.*